United States Patent
Soepenberg et al.

(10) Patent No.: US 6,681,381 B1
(45) Date of Patent: Jan. 20, 2004

(54) ARRANGEMENT FOR EXECUTING PROGRAM CODE WITH REDUCED MEMORY REQUIREMENTS

(75) Inventors: Gerrit H. Soepenberg, Eindhoven (NL); Johannes A. G. Vugts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/475,568

(22) Filed: Jan. 5, 2000

(30) Foreign Application Priority Data

Jan. 6, 1999 (EP) .............................. 99200015

(51) Int. Cl.[7] .............................. G06F 9/44; G06F 9/45
(52) U.S. Cl. ...................... 717/118; 717/139; 717/148; 717/166
(58) Field of Search ...................... 717/118, 114–117, 717/119, 124–135, 146–148, 139, 166

(56) References Cited

U.S. PATENT DOCUMENTS

| | | | | |
|---|---|---|---|---|
| 5,586,292 A | * | 12/1996 | Yamaguchi | 711/113 |
| 5,729,710 A | * | 3/1998 | Magee et al. | 711/203 |
| 5,925,100 A | * | 7/1999 | Drewry et al. | 709/219 |
| 6,134,602 A | * | 10/2000 | Engstrom et al. | 709/328 |

OTHER PUBLICATIONS

Gosling–McGilton, The Java Language Environment, a White Paper, May 1996, Sun microsystems.*
White–Garthwaite, The GC Interface in the EVM, Dec. 1998, Sun Microsystems, SML TR–98–67.*
The Java Virtual Machine Specification, by Tim Lindholm et al., May 1996.
Sun Microsystems, Inc.: Clarifications And Amendments To The JAVA Language Specification, May 4, 1998 Retrieved from the internet: <url:http://java.sun.com/docs/books/jls/unloading–radionale.html. retrieved on Jul. 24, 2000.

* cited by examiner

Primary Examiner—Antony Nguyen-Ba

(57) ABSTRACT

A Java virtual machine 2, comprises an execution engine for executing Java byte code and a memory management system 14. The memory management system 14 performs garbage collection to remove objects that are not reachable from the current state of the Java program. In the prior art memory management system objects representing a class definition are only removed from memory if the classloader object which has loaded the class object is not reachable. According to the present invention the memory management system 14 is arranged for removing classes which do not have any instantiated objects which can be reached in the present state of the program even if the classloader is still reachable. This results in a substantial saving of memory. Preferably the objects representing a class definition have a method which can signal to it that the definition can be deleted from memory if it has no instantiated objects anymore.

10 Claims, 2 Drawing Sheets

ARRANGEMENT FOR EXECUTING PROGRAM CODE WITH REDUCED MEMORY REQUIREMENTS

The present invention relates to an arrangement for executing program code, said arrangement comprises definition loading means for loading at least two definition entities into memory, said definition entities being associated with said definition loading means, the arrangement further comprises object creating means for creating objects according to said definition entity.

The present invention is also related to a method for executing program code and a tangible medium carrying a computer program for performing a method for executing program code.

An arrangement according to the preamble is known from the publication "The Java™ Virtual Machine Specification" by Tim Lindholm and Frank Yellin, which is available from the Sun web site and is converted from the printed book, September 1996, first printing.

In recent years the popularity of the Java platform has increased substantially. Java is a platform which comprises the Java language which is compiled to a byte code which runs on a Java Virtual Machine.

The use of a byte code which runs on a virtual machine has the advantage that the compiled byte code can be executed on every combination of hardware and operating system if a virtual machine exist for such combination.

The Java language is object oriented, which means that during the execution of the programs objects are created according to a definition entity, which can be a class or an interface in the Java language. Before objects can be created, the needed definition entities (classes or interfaces) have to be loaded first in memory. This loading is done by the definition loading means, which are called class loaders in the Java language. There can exist different definition loading means for different ways of loading definition entities. In Java there can e.g. be different class loaders for loading classes from disk, from a TCP/IP based network or loading them from an MPEG-2 Transport stream.

The Java virtual machine has a memory management system which performs garbage collection to delete automatically objects and classes that are not needed anymore.

When Java is to be used in consumer appliances such as TV's and set-top boxes, only limited amounts of memory resources are available. Currently the use of Java for consumer applications is quite difficult due to that limited amount of memory available.

The object of the present invention is to provide an arrangement according to the preamble in which the required amount of memory is decreased.

To achieve said objective, the arrangement according to the invention is characterized in that the arrangement comprises memory management means for removing from memory definition entities having no related objects, said definition loading means being associated with definition entities still having related objects.

By removing definition entities having no related objects anymore from memory, substantial amounts of memory can be freed, resulting in that the arrangement requires less memory than the arrangement according to the prior art.

The invention is based on the recognition that in the present specification of the Java virtual machine it is prescribed that a definition entity may only be deleted if its definition loading means is not reachable anymore. This means that no objects exist anymore of which the definition entity has been loaded by said definition loading means.

This will be made clearer in the following example. If a class loader (definition loading means) has loaded two classes (definition entities), a first loaded class having no related object anymore may not be removed from memory as long the other class still has related objects. The result of this is that classes remain unnecessary long in memory.

By using the inventive idea according to the present invention, classes may be unloaded as soon they are not needed anymore.

An embodiment of the present invention is characterized in that the arrangement comprises designation means for designating definition entities as removable, in that the memory management means are arranged for removing from memory definition entities having no related objects when the definition entity is designated as removable, and in that the memory management means are arranged for removing from memory definition entities corresponding to definition loading means being associated with only definition entities having no related objects.

There may be circumstances that it is undesirable that definition entities having no related objects are always removed from memory. This can be the case when class variables are modified by the execution of class methods. If such a class is removed from memory and is reloaded when it is needed again, the value of the class variable may be changed.

By only removing definition entities without related objects when they are designated as removable, the application program can control this removal by designating a definition entity as removable or not removable.

A further embodiment of the invention is characterized in that said arrangement comprises storing means for storing an identification of definition entities that are designated as removable.

An easy way of communicating to the memory management means whether a class can be unloaded if it has no related objects is to store a table in which all loaded classed are entered together with an indication whether this class is removable or not. Alternatively, it is possible to store the identification in an object header associated with each class object.

The present invention will now be explained with reference to the drawings.

Figure 1:
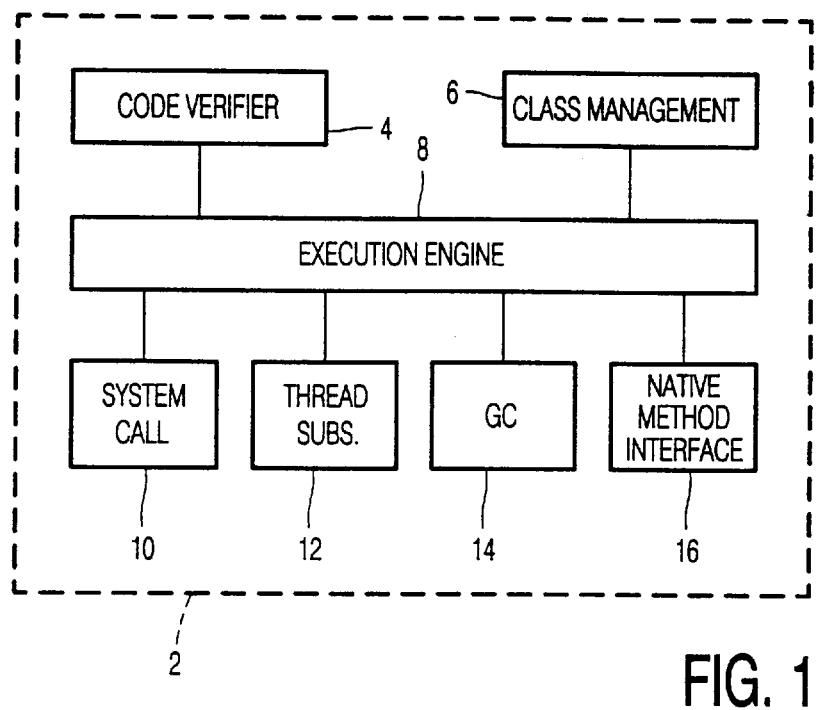
FIG. 1 shows the architecture of a Java virtual machine in which the present invention can be used.

In the Java virtual machine according to FIG. 1, a class management subsystem 6 is arranged for loading classes not present in memory from a local hard drive or from a network.

The classes to be loaded by the class management subsystem 6 are first checked by a code verifier 4. Normally only the classes loaded from a network are verified because they can be from an unknown, less reliable source. At loading the classes a syntax check is performed. Also the "semantic" consistency of the loaded class is checked. This includes e.g. the checking whether the constants defined in a class are consistent with their type. It is e.g. checked whether constants defined as strings are indeed strings.

During runtime a byte code verification is performed. This includes checking of consistency of the stack, i.e.

verifying that no stack overflow and underflow occurs. It also includes checking whether the type of data put into variables corresponds to the declaration of said variables.

An execution engine 8 is arranged for executing the verified byte code. For this execution the execution engine has three subsystems available, i.e. a system call subsystem 8 for invoking the operating system to perform certain tasks, such as the loading of an actual file from disk or from a network, or displaying graphical elements on a display device. Furthermore the Virtual Machine comprises a thread system 12 used for creating separate threads. The thread sub system 12 is also arranged for synchronizing separate threads.

The Java VM also comprises a memory management subsystem 14 which includes a garbage collector for automatically removing obsolete items from memory. In the Sun implementation of the Java VM a so-called "mark and sweep" garbage collection algorithm is used. This type of garbage collection algorithm is well known to those skilled in the art. In this algorithm, each object present in the heap has a so-called mark bit. The process of garbage collection starts with resetting the mark bit for all objects present in the heap. Subsequently all fields and variables are examined for references to objects in the heap. For each object in the heap that is referenced by a field or variable, the mark bit is set. Finally the garbage collector sweeps the heap and reclaims the memory area used by objects of which the mark bit is not set.

Finally, the Java VM comprises a Native Method Interface subsystem 16, enabling the use of functions written in C, C++ or assembler. This may be convenient in order to reuse existing libraries or to be able to use optimized assembler routines to improve performance.

Figure 2:
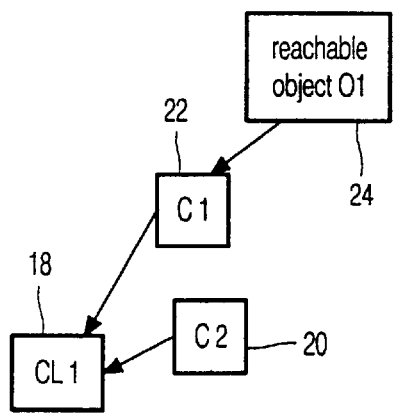
FIG. 2 shows a class loader with related classes and instantiated objects.

In the diagram according to FIG. 2, objects present in the heap of the Java VM according to FIG. 1 are presented. FIG. 2 shows a first class 22 and a second class 20, which are loaded by a class loader 18. From class 22 one object 24 is instantiated and class 20 has no instantiated objects.

When using the garbage collection algorithm according to the prior art, none of the objects 18, 20, 22 and 24 will be garbage collected, because the classloader 18 is still reachable (having an object 24 instantiated from a class loaded by said classloader 18). In the arrangement according to the invention, the class 20 can be removed from memory because it has no instantiated objects. Preferably, a method is added to the class Class to indicate whether a class can be unloaded when it has no instantiated objects anymore. The syntax of such a method can be "EnableClassUnloading (class)". This method can set a bit in the classheader of the relevant class indicating that this class is deletable. Alternatively it is possible that a table is constructed in the VM in which all deletable classes are registered.

Figure 3:
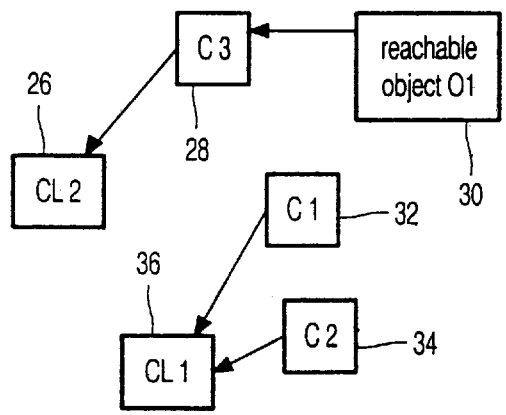
FIG. 3 shows two class loaders, one having a class with an instantiated object.

In FIG. 3 another group of objects present in the heap of a Java VM according to FIG. 1 is represented. FIG. 3 shows a first classloader 36 that has loaded a first class 32 and a second class 34. None of the classes 32 and 34 is reachable. These classes 32 and 34 and their classloader 36 will be removed from memory irrespective whether the method EnableClassUnloading is called or not, because the class loader 36 is not reachable.

FIG. 3 shows also a second classloader 26 which has loaded a class 28 from which an object 30 is instantiated. The class 28 has one reachable object 30. Consequently the classloader 26, the class 28 and the object 30 will not be unloaded (removed from memory).

It is observed that in the Java 1.2 SDK the concept of reference objects was introduced, resulting in objects that can be strongly and weakly reachable. The prior art garbage collector removes all objects that are not strongly reachable. It is observed that, when reference objects are used, the concept reachable as used in the above explanations with reference to FIGS. 2 and 3 means strongly reachable.

Figure 4:
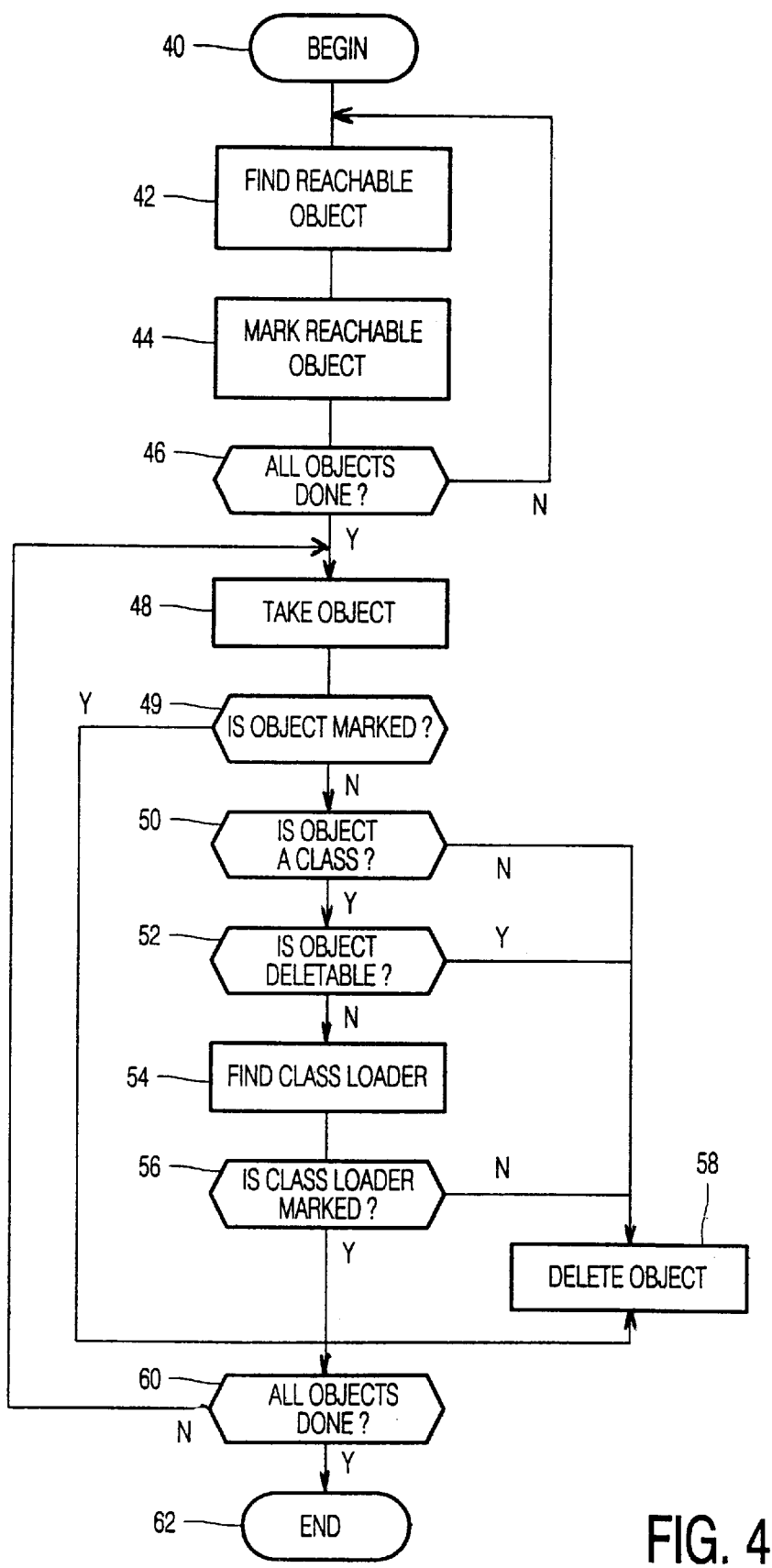
FIG. 4 shows a flow diagram of a program according to the invention for use in the memory management system 14 according to FIG. 1.

In the flowgraph according to FIG. 4, the numbered instructions have the following meaning:

| No. | Inscription | Meaning |
| --- | --- | --- |
| 40 | BEGIN | The execution of the garbage collector is started. |
| 42 | FIND REACHABLE OBJECT | A reachable object is found. |
| 44 | MARK REACHABLE OBJECT | The object is marked as reachable. |
| 46 | ALL OBJECTS DONE ? | It is checked whether all objects have been examined. |
| 48 | TAKE OBJECT | A new object is taken for garbage collection. |
| 49 | IS OBJECT MARKED ? | It is checked whether the object was marked. |
| 50 | IS OBJECT A CLASS ? | It is checked whether the object is a class. |
| 52 | IS OBJECT DELETABLE ? | It is checked whether the object is deletable. |
| 54 | FIND CLASS LOADER | The class loader corresponding to the current object is located. |
| 56 | IS CLASS LOADER MARKED ? | It is checked whether the class loader was marked. |
| 58 | DELETE OBJECT | The object is deleted from memory. |
| 60 | ALL OBJECTS DONE ? | It is checked whether all objects are processed. |
| 62 | END | The execution of the garbage collector is terminated. |

In instruction 40 of the program according to FIG. 4 the program is started and the necessary initializations take place. In instruction 42, starting from the fields and variables corresponding to the current state of the program, reachable objects are searched. If a reachable object is found, the object is marked in instruction 44. In instruction 46 it is checked whether all reachable objects are found. This is the case when all fields and variables in the current state of the VM have been traced for corresponding objects. If not all reachable objects are found yet the program jumps to instruction 42 for finding the next reachable object.

If all possible reachable objects are found, the "mark phase" of the "mark and sweep" garbage collection algorithm is completed, and the "sweep phase" is started.

In instruction 48 an object from the heap is selected for examination. In instruction 49 it is checked whether the object is marked. If the object is marked, it must not be deleted from memory, and the program continues at instruction 60. If the object is not marked, in instruction 50 it is checked whether the object is a class. This can e.g. be determined from a field in an object header associated with the object. If the object is not a class, the program continues with instruction 58 in which the object is deleted from memory. Subsequently the program is continued at instruction 60.

If the object is a class, in instruction 52 it is checked whether the class is designated as deletable. This can e.g. be done by checking whether a "deletable bit" in the object header has been set by invoking the EnableClassUnloading method. Alternatively, it is also possible that a table containing all deletable classes is consulted. If the object is deletable, in instruction 58 the class object is deleted in instruction 58.

If the class is not marked as deletable, in instruction 54 the class loader which loaded the class is searched. This can be done by reading a table in the VM which comprises the loaded classes and their associated class loader. After having found the class loader, it is checked in instruction 56 whether the class loader object is marked. If the class loader is not marked, in instruction 58 the class object is deleted. If the class loader is marked, the class is not deleted from memory and the program is continued at instruction 60.

In instruction 60 it is checked whether all objects in the heap have been processed. If this is the case, the program is terminated in instruction 62. Otherwise the program continues with instruction 48 to process the next object in the heap.

What is claimed is:

1. An arrangement for executing program code, said arrangement comprising definition loading means for loading at least two definition entities into memory, each of said definition entities being associated with said definition loading means, the arrangement further comprising object creating means for creating objects according to said each definition entity, said arrangement further comprising memory management means for removing from memory definition entities having no related objects when said definition loading means is still associated with definition entities having related objects.

2. The arrangement according to claim 1, further comprising designation means for designating definition entities as removable, said memory management means arranged for removing from memory definition entities having no related objects when the definition entity is designated as removable, and said memory management means arranged for removing from memory definition entities corresponding to definition loading means being associated with only definition entities having no related objects.

3. The arrangement according to claim 2, said arrangement comprising storing means for storing an identification of definition entities that are designated as removable.

4. The arrangement according to claim 1, said entity comprising a class.

5. A method for executing program code, said method comprising loading at least two definition entities into memory by a definition loading entity, each of said definition entities being associated to the definition loading entity, the method further comprising creating objects according to said each definition entity, the method further comprising removing from memory definition entities having no related objects when said definition loading entity is still associated with definition entities having related objects.

6. The method according to claim 5, comprising designation of definition entities as removable, removing from memory definition entities having no related objects when the definition entity is designated as removable, said method further comprising removing from memory definition entities corresponding to definition loading means associated with only definition entities having no related objects.

7. The method according to claim 6, said method comprising storing an identification of definition entities that are designated as removable.

8. A tangible medium carrying a computer program for performing a method for executing program code, said method comprising loading at least two definition entities into memory by a definition loading entity, each of said definition entities being associated to the definition loading entity, the method further comprising creating objects according to said each definition entity, the method further comprising removing from memory definition entities having no related objects when said definition loading means is still associated with definition entities having related objects.

9. A tangible medium according to claim 8, the method comprising designating definition entities as removable, removing from memory definition entities having no related objects when the definition entity is designated as removable, said method further comprising removing from memory definition entities corresponding to definition loading means associated with only definition entities having no related objects.

10. A tangible medium according to claim 9, said method comprising storing an identification of definition entities that are designated as removable.

* * * * *